United States Patent [19]

Stockburger et al.

[11] 4,432,567
[45] Feb. 21, 1984

[54] AUTHORIZATION CARD

[76] Inventors: Hermann Stockburger, Kirnachweg 7, D-7742 St. Georgen; Hans-Georg Winderlich, Niedere Strasse 36, D-7730 Villingen, both of Fed. Rep. of Germany

[21] Appl. No.: 233,332

[22] Filed: Feb. 11, 1981

[30] Foreign Application Priority Data

Feb. 14, 1980 [DE] Fed. Rep. of Germany ....... 3005432
Oct. 13, 1980 [DE] Fed. Rep. of Germany ... 8027321[U]

[51] Int. Cl.³ ........................ B42D 15/00; G06K 7/06
[52] U.S. Cl. ......................................... 283/83; 283/99; 283/904; 235/441
[58] Field of Search .................. 283/6, 7, 83, 99, 904; 40/2.2, 5, 6

[56] References Cited

U.S. PATENT DOCUMENTS

| 3,399,473 | 9/1968 | Jaffe | 40/2.2 |
| 3,624,938 | 12/1971 | Richard | 40/2.2 |
| 3,762,081 | 10/1973 | Armbruster | 40/2.2 |
| 3,816,711 | 6/1974 | Bliss | 40/2.2 X |
| 3,972,138 | 8/1976 | Armbruster | 40/2.2 |
| 4,100,689 | 7/1978 | Broune | 40/2.2 |

FOREIGN PATENT DOCUMENTS 1556241 11/1979 United Kingdom ................... 283/6
2052819 10/1980 United Kingdom ................... 283/6

Primary Examiner—Paul A. Bell
Assistant Examiner—John S. Brown
Attorney, Agent, or Firm—Donald Brown

[57] ABSTRACT

The authorization card has one or more storing zones for storing a predetermined information defining the type and/or extent of authorization, for example credit information in case of a credit card, and at least one storing zone for storing variable information associated with the owner of the card. These storing zones are adapted for automatic reading of the fixed and variable information in an automatic reading device. The authorization card has means for generating a coded information to be compared with the variable information. This coded information is manually adjusted on the authorization card by its user and is also adapted for automatic reading by the automatic reading device. Manual adjustment of the coded information is facilitated by a scale provided on the authorization card.

7 Claims, 19 Drawing Figures

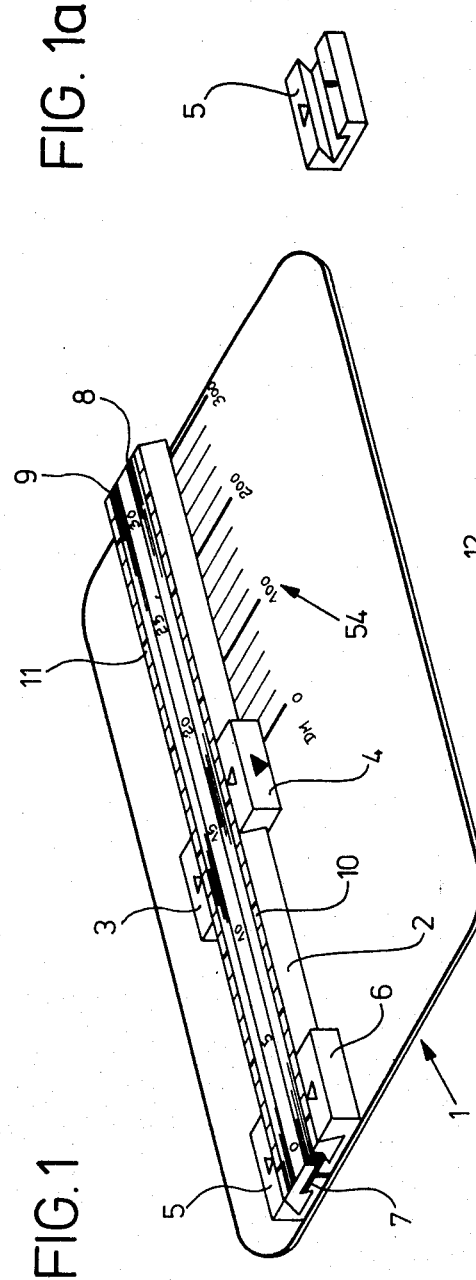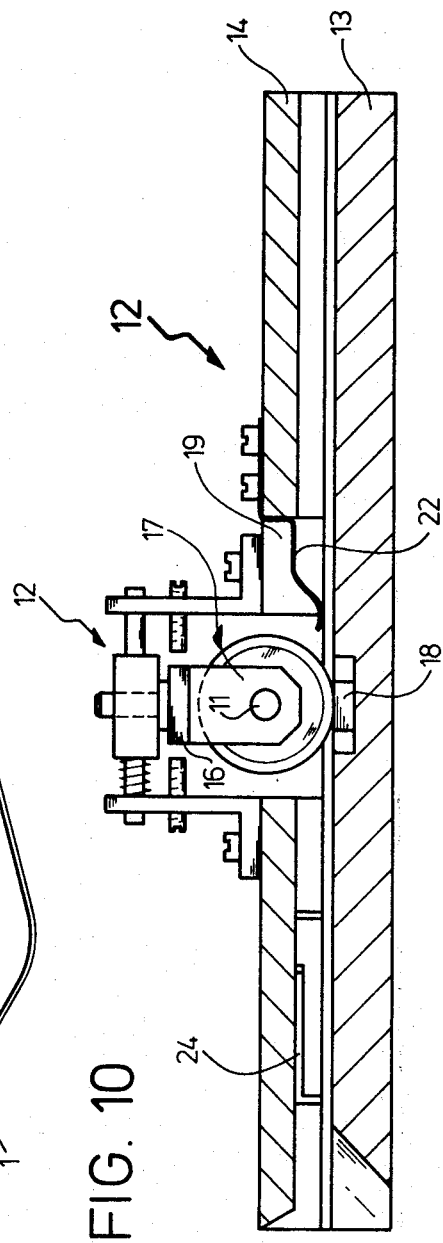

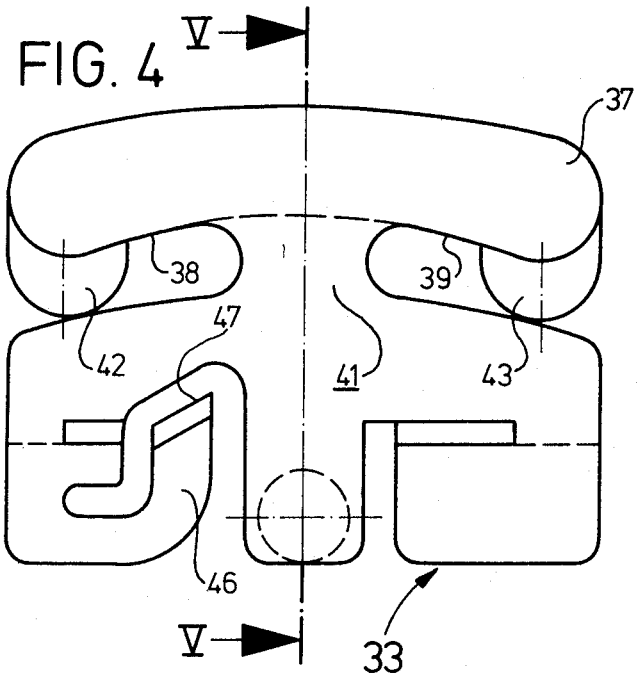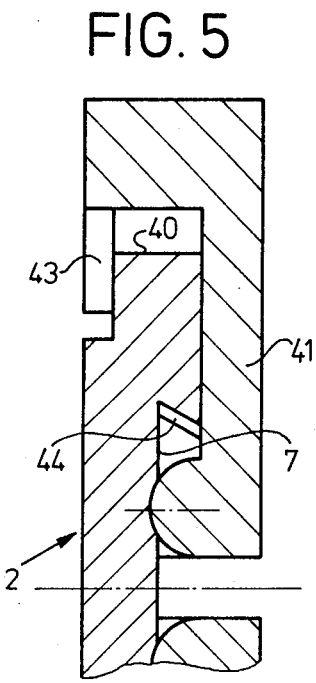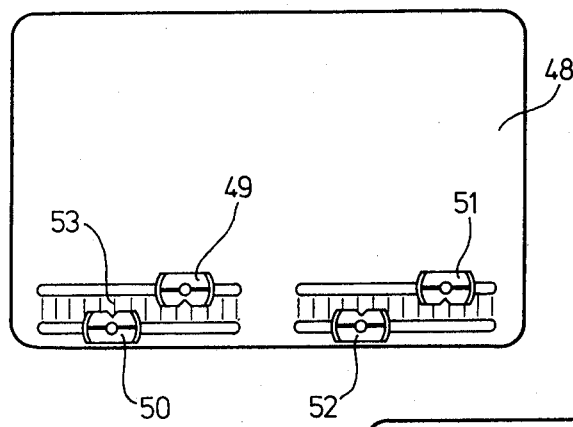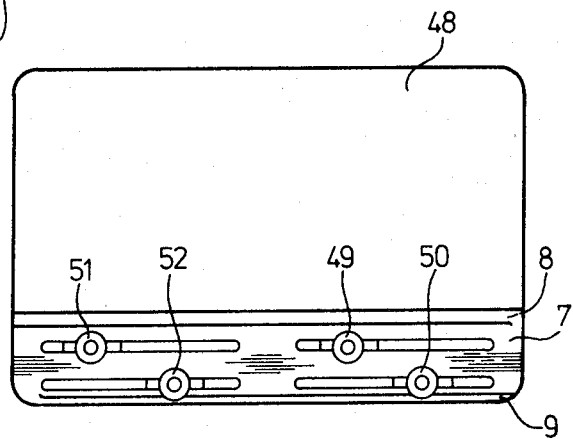

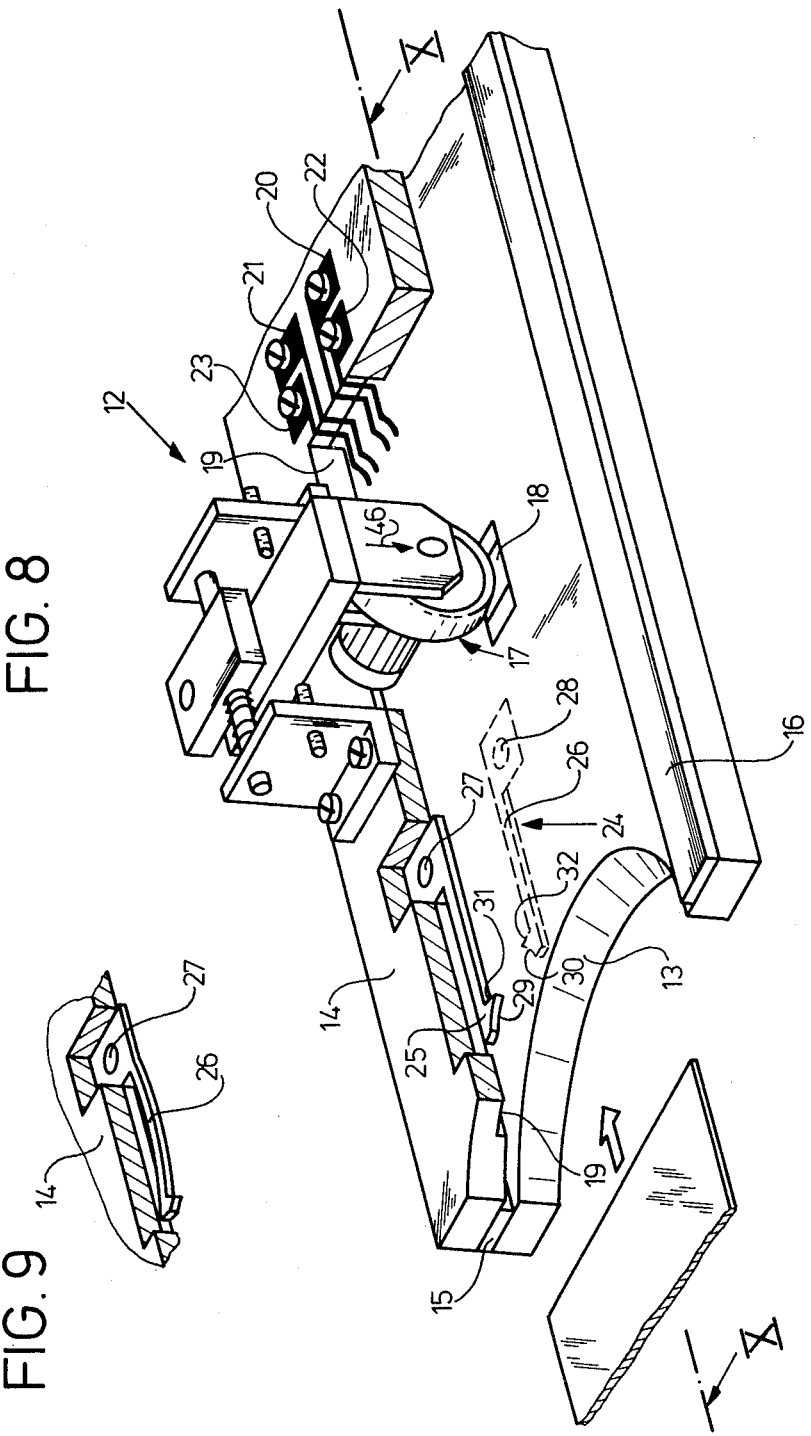

AUTHORIZATION CARD

BACKGROUND OF THE INVENTION

This invention relates to the field of authorization cards, more particularly authorization cards for use as personal identity papers, value cards, credit cards, etc.

Authorization cards of this kind should not only be adapted for verification whether they are authentic and who is the owner of the card, but it should also be possible to check whether the actual user is the authorized owner of the card. In this way, the authorization card should be protected against unauthorized use by third persons.

Conventionally, automatic evaluation devices to which the authorization cards are presented are provided with a keyboard by which the user of the card may introduce a coded number which is compared with an information stored on the card. However, there is a risk that the introduction of the coded number is observed by third persons so that third persons may know the coded number.

OBJECTS OF THE INVENTION

A primary object of the invention is to provide an improved authorization card for use as an identity card, value card, credit card, etc.

A further object of the invention is an improved authorization card adapted to generate a coded information to be compared with a variable information associated with ther owner of the card and stored on the card.

It is a further object of the invention to provide an authorization card having means for generating coded information by manual adjustment which is almost impossible to be observed by any third persons.

A further object of the invention is to provide an authorization card not requiring a code number to be introduced into an automatic reading device by actuation of a keyboard.

SUMMARY OF THE INVENTION

In accordance with the invention the authorization card has at least one storing zone for storing fixed information defining the type and/or extent of authorization. The authorization card further comprises a storing zone for storing variable information associated with the owner of the card. Both of these storing zones are adapted for automatic reading by an automatic reading device to which the authorization card is presented. In accordance with an important feature of the invention, the authorization card includes means for generating a coded information by manual adjustment. The adjusted coded information may be read from the authorization card upon presenting of the same to the automatic reading device, and is compared with the variable information to acknowledge proper use of the card in case the adjusted coded information corresponds with the variable information, but to refuse authorization in case these do not correspond with each other.

Thus, in a preferred embodiment of the invention, the authorization card has some kind of coded number lock. Within a zone from which the coded information is detected, there is a specific movable member. The authorization card will only be recognized as being authentic in case that portion of the member lying within the detected characterizing zone has a pattern the inherent characterizing information of which is recorded in coded form on an information recording track provided on the card. For example, with a member having ten possible positions, the pattern on the member will only have a "correct" position in one of these possible positions, in which identity between the characterizing information and the information contained on the recording track is determined. The pattern of the member may consist of characters or of a surface or three-dimensional structure. By selecting a predetermined position of the member on or within the authorization card and successive detection of the characterizing zone of the card, the characterizing information is generated. The characterizing information can either be read at one or at a plurality of positions or along a line of the authorization card. For example, by reading or detecting along a line extending across the characterizing zone, a continuous characterizing protocol may be established which must correspond with an authenticity protocol contained on a protocol track of the authorization card, in order to recognize the authorization card and the adjustment of its at least one adjustable member as being authentic.

In accordance with a preferred embodiment, just in the manner of a coded number lock, a plurality of strips or plates are used each of which extends in an associated characterizing zone. To define the positions of the plates or strips, each plate or strip can be associated with a scale, so that the user will adjust a combination of numbers to bring the authorization card into its state of authenticity.

In accordance with a further preferred embodiment of the invention, the plate is formed as a circular disc which may be rotated about its axis to be brought into different rotational positions. In accordance with another embodiment, the plate may be slidably moved along a linear path. Further, it is possible to provide the scale of the plate or strip with automatically readable characters, and with each of the possible positions, one respective character is presented within the characterizing zone of the card to be read in an automatic reading device to which the card is presented.

For various kinds of use, the authorization cards may be consumer articles, which, although they may represent a substantial amount of money, should be susceptible of low-cost mass production in view of the materials used therefor. For producing an authorization card of this kind, the data support is replaceably fit into a frame supporting the movable plate or plates. The data supports are clamped within the frame for the duration of their validity, and are completed by the movable plate. After its removal or the end of validity thereof, the data support is replaced by a new one, whereas the frame may be used further on.

In accordance with an advantageous embodiment of the invention, the plate is provided with a catch member which, upon passing of a guide member of an automatic device, causes repositioning of the plate into a defined zero position. When evaluation of the authorization card is completed, all of the plates are thus brought into a neutral position so that, upon release of the authorization card by the automatic device, the secret number combination is not adjusted any longer.

An essential advantage of the inventive system is based on the fact that the signals resulting from the respective positions of the adjustable members do not allow any conclusion with respect to the adjustment positions. This is an important progress over keyboards mounted on the actual automatic devices. With keyboards of this kind, there is a possibility of getting knowledge of the secret number as introduced, by manipulating the automatic device. With the inventive authorization card, however, although a number is adjusted on a scale, the characterizing information introduced into the automatic device is not necessarily a number, but rather a value of contrast or a sequence of analog or digital signals for example which are generated during the detection procedure. Even in case these signals are known, it would not be possible to get any information with respect to the combination of numbers to be adjusted on the card, in order to achieve this signal behaviour.

In case the user of the authorization card should make any mistake upon adjustment of the secret number, the authorization card will be restituted by the automatic evaluation device. Eventually, this may be tolerated two or three times. Upon further false adjustment, the card would be automatically withdrawn by the automatic device and not restituted. This would prevent the non-authorized holder of the authorization card to try to find out the secret number by many attempts.

DESCRIPTION OF PREFERRED EMBODIMENTS

Further objects and advantageous features of the invention will stand out from the following non-limitative description of several embodiments with reference to the drawings, wherein:

FIG. 1 is a perspective view of an authorization card in accordance with a first embodiment;

FIG. 1 (a) shows a more detailed view of a slider of the card shown in FIG. 1;

FIG. 4 is a detailed view of the devices shown in FIGS. 2 and 3, at an enlarged scale and seen from the bottom;

FIG. 5 is a sectional view against line V—V in FIG. 4;

FIG. 6 is a bottom view of another embodiment;

FIG. 7 is a plan view of the authorization card of FIG. 6;

FIG. 8 is a perspective, partially broken view of a device for using the authorization card;

FIG. 9 is a partial view of the device shown in FIG. 8;

FIG. 10 is a sectional view along line X—X in FIG. 8;

Figure 2:
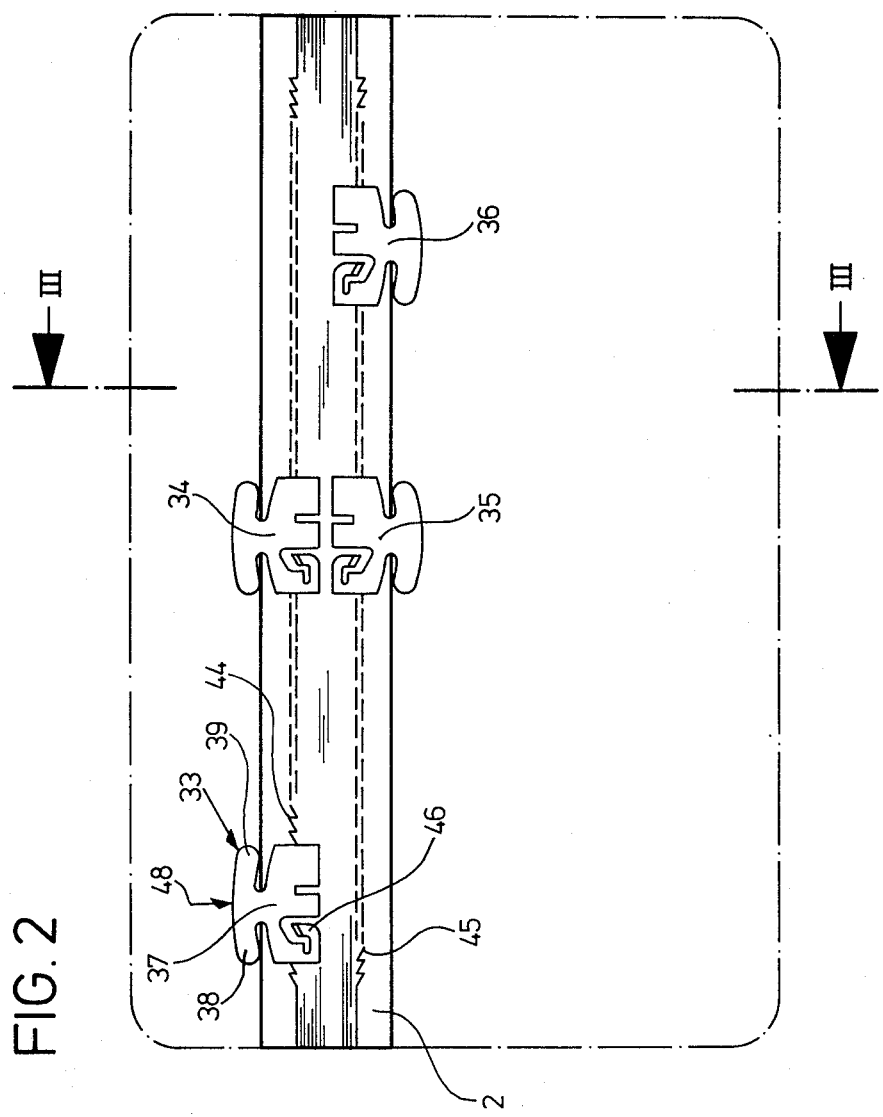
FIG. 2 is a bottom view of another embodiment of the invention.

In the embodiment of the authorization card 1 shown in FIG. 1, an adjustable zone is provided for generating information used for identification and/or verification of authorization, by a bracket 2 mounted on the authorization card and having sliders 3, 4, 5, 6 sliding thereon. On its bottom side, the slider is provided with a resistor track 7 extending over its entire length. The visible end of the resistor track 7 is connected with a conductor path 8 extending on the upper face of the slider, and the opposed end of the resistor track 7 is connected with a second conductor path 9 extending on the upper face of the slider. The bracket 2 is suitably connected with the authorization card. For example, it may laterally engage the authorization card, or it may be provided with extensions projecting on its bottom engaging into recesses of the authorization card in such a manner that the latter will be held under tension. The resistor track 7 has a non-linear, continuously varying characteristic in longitudinal direction so that any position of the track is associated with one and only one voltage value, in a unique manner.

The authorization card 1 is processed in a station 12 shown in FIGS. 8 through 10. This station comprises a base plate 13 and a cover plate 14. The cover plate is held with a predetermined spacing from the base plate by laterally provided strips 15, 16. Further, a magnetic head 18 is provided for reading or writing data from and into a magnetic track. The authorization card which is initially only partially inserted into the slot will be moved by a card transport device 17 in such a manner that the magnetic head will be able to read or write on the total magnetic track.

As will be seen best in FIGS. 8 and 10, a recess 19 opening towards the card slot in the form of a channel is provided in the cover plate 14, such recess extending over the entire length of the cover plate parallel to the moving direction of the authorization card, and the dimensions thereof being selected in such a manner that the bracket 2 with the sliders 3 through 6 may pass through the recess of the station upon passing of the authorization card. Wiper contacts 20, 21, 22, 23 extending into the recess 19 are provided on the cover plate 14 and are laterally staggered and sufficiently extend into the slot between the cover and base plates for engagement of the wiper contacts 20, 21 with the conductor paths 8, 9 respectively, and the wiper contacts 22, 23 with the sliders 4, 6 and 3, 5 respectively, when the above disclosed authorization card 1 is pushed in, as soon as these sliders are passed below the respective wiper contacts depending on their adjustment. The sliders 3, 4, 5 and 6 are preferably formed of plastics material and provided with a metallic coating of satisfactory conductivity. The wiper contacts 20, 21 are connected with a voltage source through which the total voltage is applied to the resistor track 7. The wiper contacts 22, 23 are respectively connected with a voltage measuring device, in such a manner that, for each adjustment of one slider, a resistance value or voltage dividing ratio is measured in accordance with the principles of the voltage dividers. Prior to using the authorization card, the user will perform a PIN adjustment of the sliders (number and/or letters) on the bracket which he may select or which is allotted to his person. Upon activation of the card, when the authorization card passes the station, the voltage ratios corresponding to the adjustment are detected and a binary code information is formed therefrom by a data processing system not shown. These are written on a magnetic track of the authorization card, besides the information with respect to the authorization which may be claimed through the authorization card and any further information. Upon later use of the authorization card, the user will again adjust his characteristic PIN combination (number or letters). When the authorization card is passed through the station, the characteristic voltage ratios determined by the adjustment are again detected, and binary-coded information is formed therefrom. In the data processing system not shown, this binary-coded information is then compared with binary-coded information read from the magnetic track. In case of corresponding information, it is assumed that the user is the authorized owner of the card. In case of non-correspondence, the station will indicate that the authorization is refused.

In order to keep the personal memorized number PIN, which is characteristic for its user, secret from any third persons after use of the authorization card, the station is provided with a reset device 24. This is best shown in FIG. 8. It is formed of two reset catches 25, 26 which may be pivoted about axes 27, 28 mounted on the cover plate 14 and extending perpendicularly with respect to the slot direction. The reset catches are resiliently biassed in such a manner that they urge against the slider through their noses. The catch ends are provided with surfaces 29, 30 tapering towards the opening. Upon introduction of the authorization card, the tapered surfaces 29, 30 will push the reset catches through the sliders 3 through 6 outwardly in such a manner that the sliders may pass. When the authorization card is moved backwards in the opposite direction, the reset catches 25, 26 will engage the sliders 3 through 6 by their engagement surfaces 31, 32 to pull the same back to an abutment in a right hand direction in FIG. 1. The reset catches are formed of resilient spring material such as plastics. Due to their resiliency, the legs will bend outwardly to some extent in the manner shown in FIG. 9, as soon as the sliders are repositioned at the abutment and the force urging on the catches is increased. Finally, the reset catches will bend outwardly to a sufficient extent to release engagement with the sliders so that the authorization card may be withdrawn.

Figure 3:
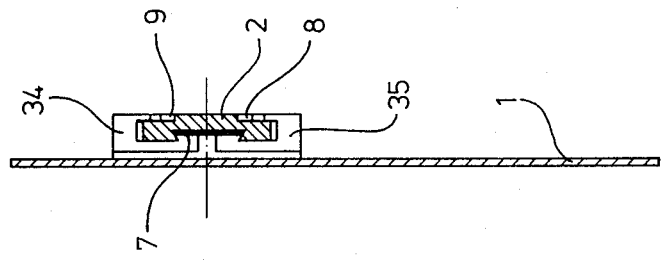
FIG. 3 is a sectional view along line III—III in FIG. 2.

The embodiment shown in FIGS. 2 and 3 essentially corresponds with the above disclosed embodiment of the authorization card. Only the sliders 33, 34, 35, 36 which are shown from the bottom in FIG. 2 (the actual card is only schematically indicated, and FIG. 1 is a plan view of the bracket 2 and the associated sliders) defer from the sliders shown in FIGS. 1 and 1(a) by the fact that they are formed in such a manner that they may provide a snapping connection with the bracket. FIGS. 4 and 5 show bottom and laterial sectional views, respectively. The slider 33 is provided with an arcuately formed wall portion 37 having inwardly directed legs 38, 39 resting on the outer edge 40 of the bracket. As may be best seen in FIG. 5, the slider contacts the bottom side of the bracket 2 by its base portion 41. On its side opposite the base portion, guiding members 42, 43 are provided at each leg, contacting the upper surface of the bracket 2. Below the resistor track 7 on the bracket 2, and directed towards the former, the base portion has a pallet-formed recess on its end which slides along the resistor track upon movement of the slider. The bracket 2 is provided with locking teeth 44, 45 (see FIG. 2) extending over its entire length on its bottom side. The slider 33 has a resilient arm 46 on one end of its base portion, this arm being formed and arranged in such a manner that it may engage the locking teeth. The end 47 of the arm which may engage with the locking teeth is tapered in such a manner that the snapping engagement between the slider and the locking teeth may be released in the position shown in FIGS. 2 and 4 when the slider is moved towards the left-hand side, but not towards the right-hand side. To perform the adjustment, the user will push on the wall portion 37 in the direction of arrow 48a (see FIG. 2), the resilient legs 38, 39 being somewhat deflected so that the snapping engagement between arm 46 and the locking teeth is released and the slider may be moved in both directions for adjustment of the PIN. The engagement will occur in the predetermined position. The card will now be inserted into the station in such a manner that the sliders may not be displaced by the reset catches, due to the locking in one direction. However, when pushed out, the sliders may be pushed back into the zero positions, due to the tapered ends 47.

FIGS. 6 and 7 show a modified embodiment of an authorization card 48 in which the resistor track 7 and the first conductor path 8 and second conductor path 9 for applying the voltage to the resistor track 7 are directly applied on the card. Slots are provided in which metallic conducting sliders 49, 50, 51, 52 may slide, just as with the embodiments disclosed above. Their adjustment may be performed on one side of the card by means of a suitable scale 53.

With the embodiments of FIGS. 2 through 5 just as with those of FIGS. 6 and 7, the actual procedure of evaluation is performed in the same manner as with the first embodiment disclosed above. Particularly, the two embodiments of the authorization card disclosed in the last place may be evaluated in the above disclosed station 12.

With the embodiments disclosed above, all of the sliders were used for adjustment of the memorized number (PIN) characterizing the authorized user. Principally, it is also possible to use one of the sliders or an additional slider for introducing transaction orders into the station. In the embodiment shown in FIG. 1, the slider 4 is used for introducing such transaction orders. To this end, the card is provided with a value scale 54. By means of the slider 4, the operating person may for example adjust the withdrawal of a predetermined amount on the value scale 54. The resistance value resulting from this adjustment is detected through the wiper contact 22. This resistance value is converted into a binary code by a suitable converting system for controlling a corresponding money delivery station.

It is essential for the above disclosed invention that the resistor tracks 7 of different brackets are formed in a manner not to be similar but to defer from each other in accordance with a random distribution. Further, it is important that, by the above disclosed measurement method not resistance values are directly measured, but rather voltage divider ratios. The visible scale being linear per se is always projected on a non-linear individual characteristic, in such a manner that a user, even having possession of the personal memorized number, will be unable to adjust another bracket therewith, because the resistor track will have another behaviour so that the same adjustment will lead to another information result.

Figure 11:
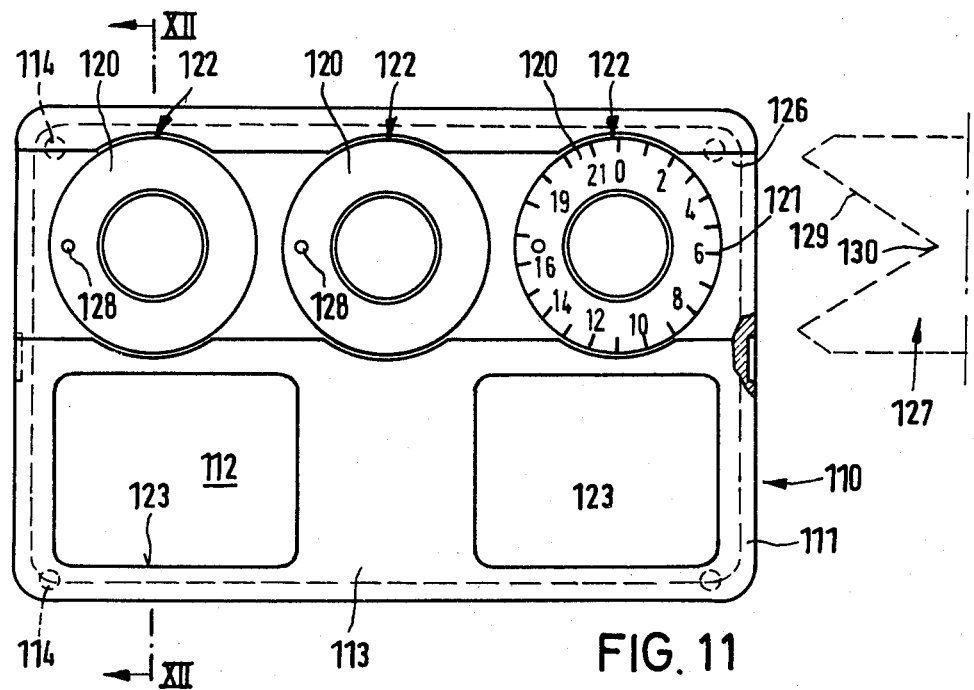
FIG. 11 is a plan view of an authorization card which is replaceably fit into a frame.
Figure 12:
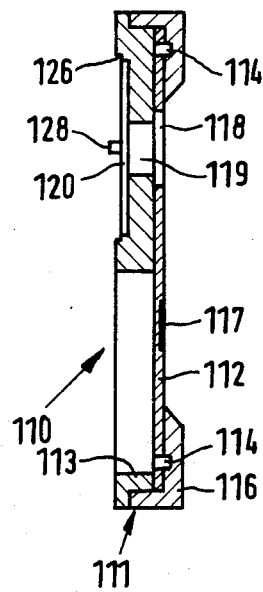
FIG. 12 is a sectional view XII—XII in FIG. 11.

The authorization card 110 of FIGS. 11 and 12 consists of a relatively rigid plastics frame 111 and a data support 112 replaceably fixed in the plastics frame 111. The rectangular plastics frame 111 is formed in two parts. It is provided with a plate-shaped base portion 113 against one face of which the data support 112 is applied. Adjacent the corners, studs 114 are projecting from the base part 113, such studs extending through holes 115 of the data support 112. The second frame portion 116 partially extends over the base part 113, so that both frame parts 113 and 116 are held in fixed mutual association, the studs 114 penetrating into corresponding holes of the second frame part 116. The second frame part 116 has an edge of L-shaped profile one of the legs of which covers the edge of the data support 112 and pushes against the base part 113.

Figure 13:
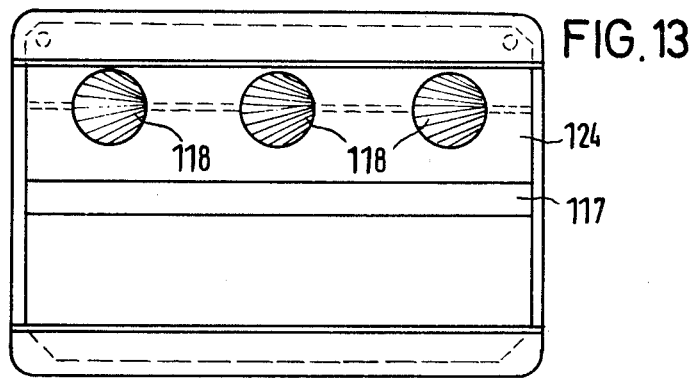
FIG. 13 is a bottom view of the authorization card of FIG. 11.
Figure 14:
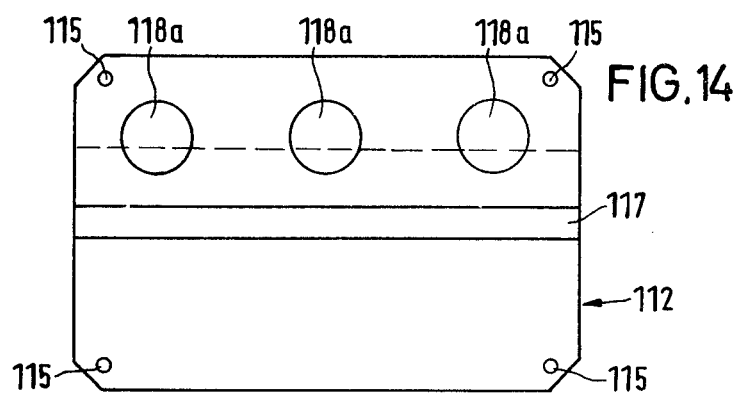
FIG. 14 is a plan view of the authorization card of FIGS. 7 through 13.

The data support 112 which is separately shown in FIG. 13 is of substantially rectangular shape and consists of paper or foil material. A recording track 117, e.g. a magnetic track, extends over the length of the data support. Further, the data support 112 has three juxtaposed circular openings 118a.

When the data support 112 is clamped or tensioned within the frame 111, the holes 115 are occupied by the circular discs 118. The circular discs 118 substantially have the thickness of the data support 112. The outer surface lying substantially within the plane of the outer face of the data support 112 is structured as shown in FIG. 13 by dashes, lines, magnetic particles, plastic molding, etc. in a manner to be susceptible of automatic detection. From the backside of each plate 118, a cylinder 119 extends through a bore of the base part 113, and on the cylinder 119, on its face directed away from the plate 118, a disc 120 is mounted extending parallel to the plate 118. By rotating the disc 120 the cylinder 119 and the associated plate 118 is rotated as well. The discs 120 are thus on the backside of the authorization card 110 facing away from the data support 112. They are lodged in recesses so that they do not project from the back face. Each disc 120 is provided with a number scale 121, and on the base part 113, fixed markings 122 are applied on which the desired numbers of the scales 121 may be adjusted.

Upon detection of the data support, the authorization card 110 is moved along two sensing heads. The first sensing head detects the magnetic track 117 (FIG. 13), while the second sensing head moves with respect to the authorization card 110 along a reading track 124 extending parallel to the magnetic track and extending over the plates 118. Depending on the rotational position of one of the plates 118, a different pattern will pass into the zone of the reading track 124. Specific characterizing data are recorded on the magnetic track 117 corresponding to those data, with which a predetermined combination of rotational positions of the plates 118 only known to the owner of the card, are generated at a sensing head moved with respect to the authorization card 110 along the reading track 124. Only in case a predetermined combination of rotational positions of the plates 118 is adjusted, there will be coincidence between the characterizing information defined by the rotational positions of the plates 118 and the information recorded on the magnetic track 117.

As shown in FIGS. 11 and 12, the discs 120 are thus arranged to be countersunk within a channel 126 on the backside of the authorization card 110. Prior to the delivery of the authorization card from an automatic system, a channel 126 will be slided over a guide member 127 bringing all of the discs 120 into a neutral position before the authorization card leaves the automatic system. In order to permit this, pins 128 project from the discs 120 to be inserted into a guiding slot 130a of the guiding member 127 through a funnel-shaped introduction part 129, when the authorization card is moved along the guiding member 127. This will ensure that the plates are in the zero position when the authorization card leaves the automatic system.

Figures 15, 16:
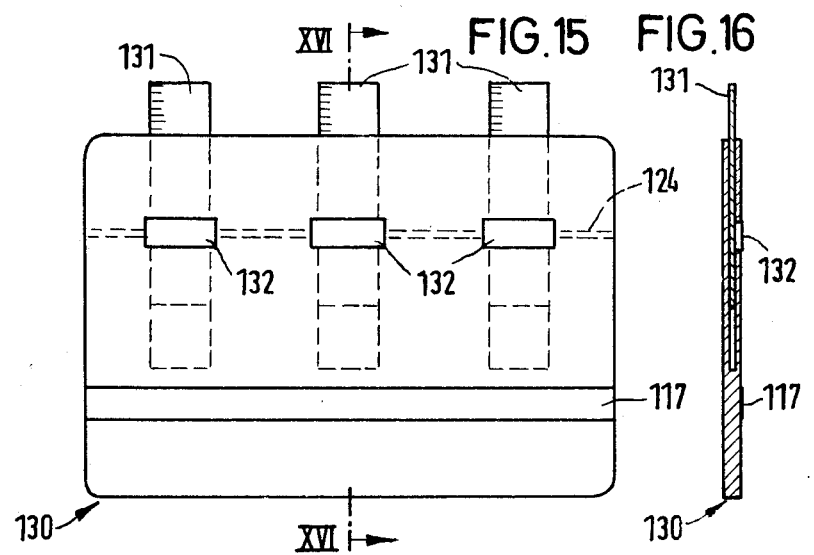
FIG. 15 shows an authorization card having a plurality of slidable strips.
FIG. 16 is a sectional view along line XVI—XVI in FIG. 15.

In the embodiment shown in FIGS. 15 and 16, the authorization card 130 has three strip-shaped sliders 131 which may be slided to different extents into slots extending from one longitudinal edge to the inside of the card. Within the zone of each slot, a window 132 is provided on the upper face of the authorization card, the strip 131 being visible therethrough. The reading track 124 extends parallel to the magnetic track 117 and extends over the windows 132.

The upper faces of the strips are provided with a structure which varies across the strip length. Depending on how far a strip 131 is slided into a respective slot of the authorization card, different sensing results will be found in the zone of the reading track 124 at the sensing head (not shown).

Figure 17:
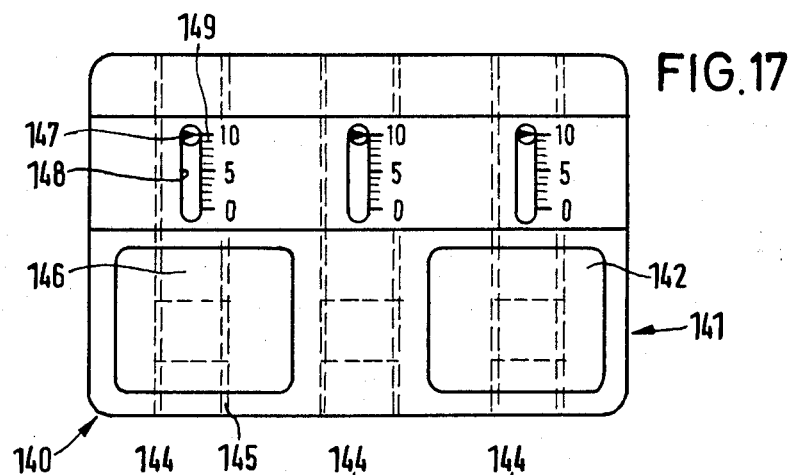
FIG. 17 shows an authorization card having plates which are slidable within a frame.
Figure 18:
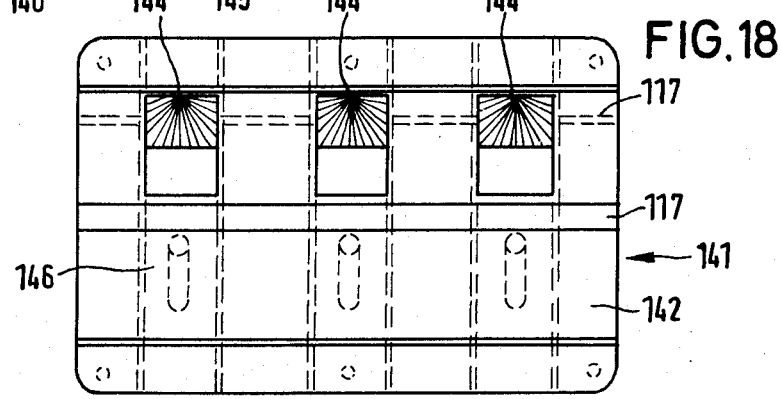
FIG. 18 is a bottom view of the authorization card of FIG. 17.
Figure 19:
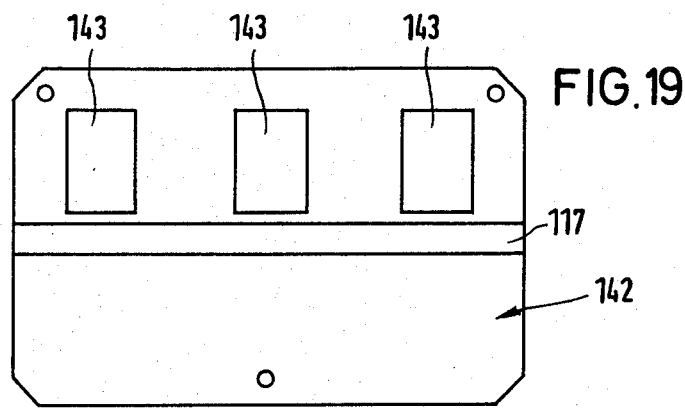
FIG. 19 shows an authorization card in accordance with the embodiment of FIGS. 17 and 18.

In the embodiment of FIGS. 17 through 19, the authorization card 140 is provided with a frame 141 into which a data support 142 is fitting. The data support 142 is provided with a magnetic track 117 and three rectangular recesses 143 for the variable partial surfaces. Plates 144 are slidable within the rectangular recesses 143 and are part of the frame and guided on the frame in guides 145 of dovetail type extending transverse to the magnetic track 117. The plates 144 extending into the recesses 143 are provided with guiding strips 146 lodged inside the frame, and studs 147 are projecting from these guiding strips towards the frame backside, being displaceable in slots 148 on the frame backside. A scale 149 is arranged along each slot 148.

When the structured rectangular plates 144 are displaced within the recesses 143 of the data support and corresponding recesses of the frames, the strips 146 are displaced as well, and the extent of displacement is shown by the positions of the studs 147 on the scale 149. In this manner, the plates 144 may be adjusted to different positions which may be read from the scales 149. Depending on the respective positions of the plate 144, different parts of the plates pass into the recording track 117 so that, upon sensing or detecting the recording track 117, a different signal behaviour will result.

In the above disclosed embodiments, the authorization cards have a magnetic strip as a memory medium. However, the invention may be used with authorization cards having other kinds of memorizing media such as solid state memories, particularly those adapted to perform further logic decisions.

It should be understood that the above description of examples of embodiments is in no way limitative and that many modifications may be brought thereto without departing from the true spirit of the invention.

What is claimed is:

1. An authorization card having at least one storing zone for storing fixed information defining the type and/or extent of authorization and at least one storing zone for storing variable information associated with the owner of said card, said storing zones being adapted for automatic reading of said fixed and variable information in an automatic reading device, and further comprising means for generating a coded information by manual adjustment, said coded information being adapted for automatic reading by said automatic reading device and to be compared with said variable information, said coded information generating means includes scale means for facilitating said manual adjustment, wherein said coded information generating means comprises at least one zone of electrical resistivity on said card, wherein manually adjustable stop means are in sliding engagement with said zone of electrical resistivity.

2. The authorization card of claim 1, wherein said coded information generating means comprise a bracket having manually adjustable stop means sliding thereon and being mounted on said card.

3. An authorization card having at least one storing zone for storing fixed information defining the type and/or extent of authorization and at least one storing zone for storing variable information associated with the owner of said card, said storing zones being adapted for authomatic reading of said fixed and variable information in an automatic reading device, and further comprising means for generating a coded information by manual adjustment, said coded information being adapted for automatic reading by said automatic reading device and to be compared with said variable information wherein said coded information generating means includes an adjustable member projecting into a zone to be sensed for detection of said coded information, said member having a surface and/or three-dimensional pattern presenting different pattern positions to said zone to be sensed for different adjustment positions of said member.

4. The authorization card of claim 3, wherein said member includes at least one disc rotatably mounted on said card and adapted to be brought into different rotational adjustment positions by manual adjustment.

5. The authorization card of claim 3, wherein said member includes strip or plate means slidably supported on or in said card and adapted for manual adjustment into different positions of linear movement.

6. The authorization card of claim 4 or 5, wherein said member is mounted on a frame supporting said card.

7. An authorization card comprising a card body as data carrier and means for generating a coded information by manual adjustment, said card body and said means being formed as separate parts which are connected for use and where the card body is replaceable, wherein said coded information generating means includes an adjustable member projecting into a zone to be sensed for detection of said coded information, wherein said adjustable member has a surface and/or three-dimensional pattern presenting different pattern positions to said zone to be sensed for different adjustment positions of said adjustable member.

* * * * *